(12) United States Patent
Williams

(10) Patent No.: US 9,545,972 B2
(45) Date of Patent: Jan. 17, 2017

(54) VARIABLE MAGNETIC BINDING SYSTEM FOR BICYCLE PEDAL

(71) Applicant: David Delon Williams, Provo, UT (US)

(72) Inventor: David Delon Williams, Provo, UT (US)

(*) Notice: Subject to any disclaimer, the term of this patent is extended or adjusted under 35 U.S.C. 154(b) by 76 days.

(21) Appl. No.: 13/843,859

(22) Filed: Mar. 15, 2013

(65) Prior Publication Data

US 2013/0269477 A1 Oct. 17, 2013

Related U.S. Application Data

(60) Provisional application No. 61/686,772, filed on Apr. 13, 2012.

(51) Int. Cl.
*B62M 3/00* (2006.01)
*B62M 3/08* (2006.01)

(52) U.S. Cl.
CPC ............. *B62M 3/086* (2013.01); *Y10T 74/217* (2015.01)

(58) Field of Classification Search
CPC .................................................... B62M 3/086
USPC ............. 74/594.1, 594.4, 594.6; 36/131, 132
See application file for complete search history.

(56) References Cited

U.S. PATENT DOCUMENTS

| 588,038 | A | * | 8/1897 | Tudor | .......................... 74/594.6 |
| 3,667,771 | A | | 6/1972 | Larson | |
| 5,473,963 | A | | 12/1995 | Aeschback | |
| 5,704,256 | A | | 1/1998 | De Lattre | |
| 7,823,300 | B2 | | 11/2010 | Fullerton et al. | |
| 2003/0035295 | A1 | * | 2/2003 | Chiu | .............................. 362/473 |
| 2010/0214792 | A1 | * | 8/2010 | Chia-Li et al. | ................ 362/473 |
| 2011/0219911 | A1 | * | 9/2011 | Zoumaras et al. | ............ 74/594.6 |
| 2011/0302811 | A1 | * | 12/2011 | Chang | .............................. 36/131 |

FOREIGN PATENT DOCUMENTS

| DE | WO2006042622 | | 4/2006 | |
| JP | 03243488 | A * | 10/1991 | .............. B62M 3/08 |
| TW | EP 2196387 | A1 * | 6/2010 | ............ B62M 3/086 |
| WO | WO 9426582 | A1 * | 11/1994 | .............. B62M 3/08 |

OTHER PUBLICATIONS

Charlie Sorrel, Magnetic Bike Pedals Work With Any Shoe, Wired Magazine, Sep. 24, 2009, http://www.wired.com/gadgetlab/2009/09/24912/.
Cycling Plus, Mavic EZ-Ride Evolve pedals review, Bike Radar, Sep. 3, 2009, http://www.bikeradar.com/gear/category/components/pedals/product/review-mavic-ez-ride-evolve-35104/.
(Continued)

*Primary Examiner* — Vicky Johnson

(57) ABSTRACT

An adjustable magnetic binding system used for attaching a shoe to a bicycle pedal. The magnetic element is integrated into the bicycle pedal in such a manner as to exert attractive forces to the shoe, which contains a shoe piece. The pedal may contain a variety of differently shaped, sized, or number of magnets, which may be retained within the pedal by a protective layer of material. These variables can be easily modified to suit the rider's skill level and desired attractive force to the pedal. The shoe is further secured onto the pedal by means of a retaining system. The shoe is readily removed by the rider with a natural rotation of the foot, which breaks the attractive force.

14 Claims, 16 Drawing Sheets

(56) References Cited

OTHER PUBLICATIONS

Brad, Mavic EZ Ride Pedal System, Urban Velo, Feb. 6, 2009, http://urbanvelo.org/mavic-ez-ride-pedal-system/.
Mavic EZ Ride pedal system launched, Bike Magic, Jan. 12, 2009, http://bikemagic.com/bike-components/mavic-launches-ez-ride-pedal-system.html#YdXD01FbdBSUDOCb.97.
Chris Weiss, Mavic Magnetic Bicycle Pedals, Inventor Spot, http://inventorspot.com/articles/mavic_magnetic_bicycle_pedals_32390, no publication date shown; accessed online Mar. 3, 2015.

* cited by examiner

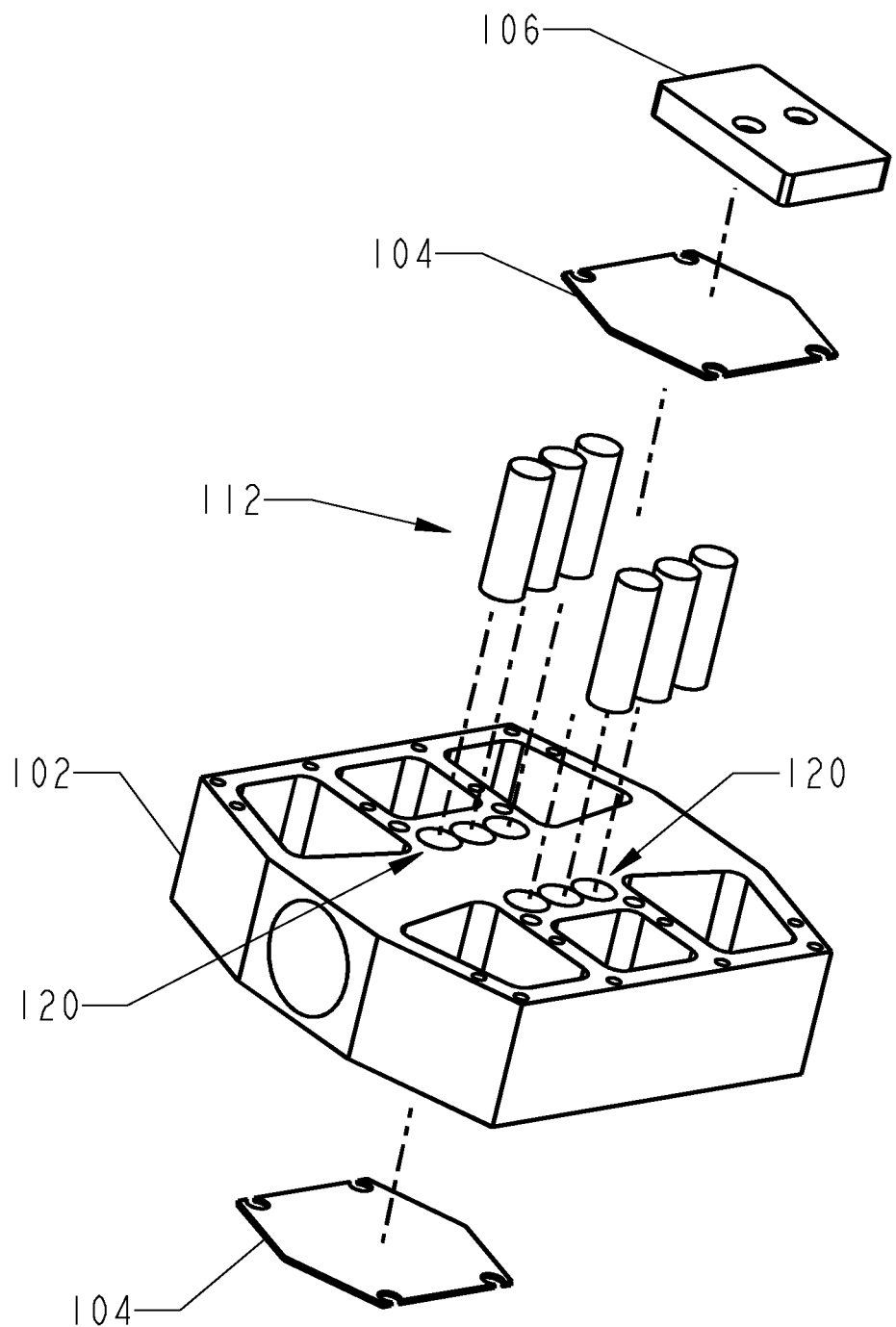
FIG IC

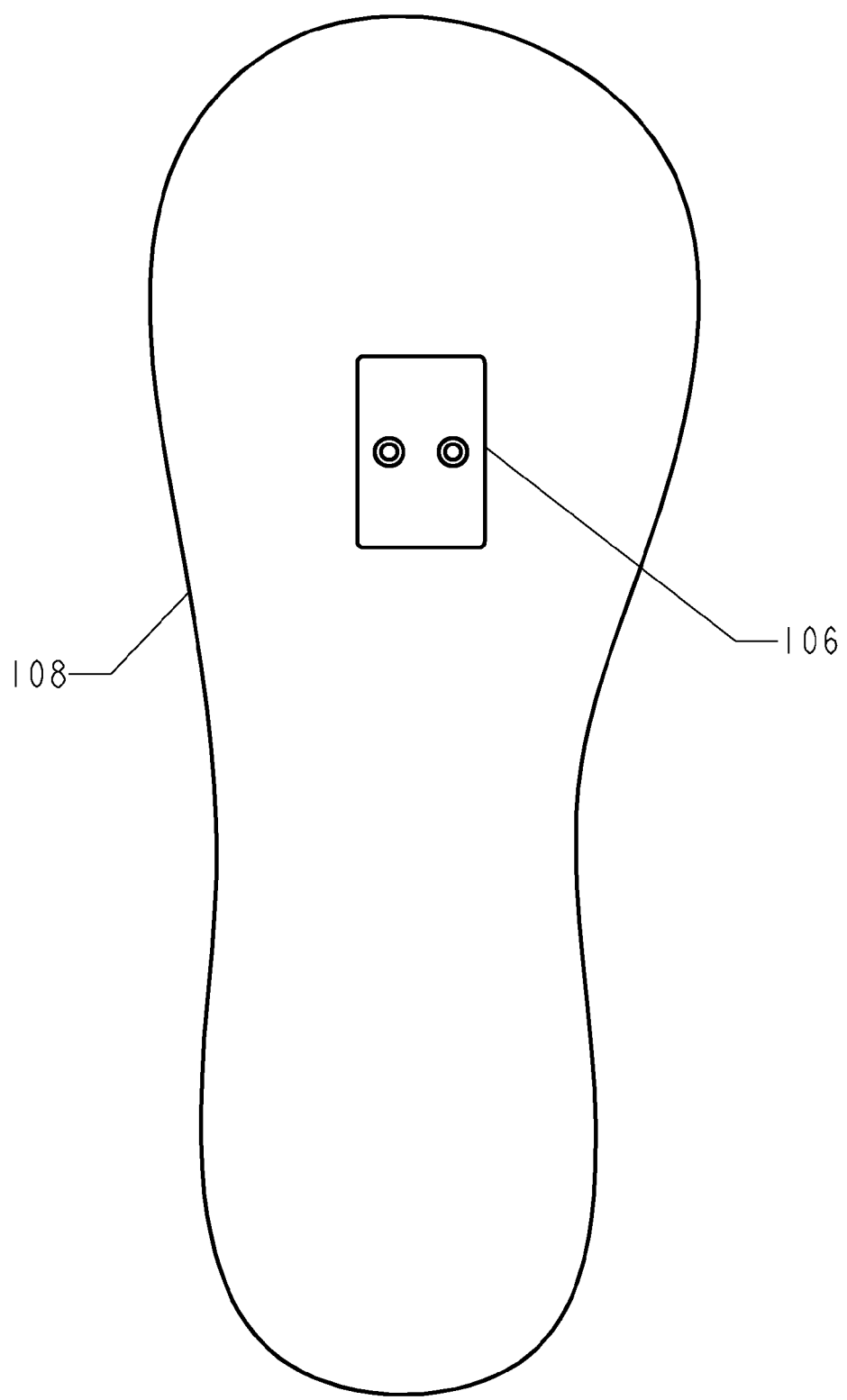
FIG ID

VARIABLE MAGNETIC BINDING SYSTEM FOR BICYCLE PEDAL

CROSS-REFERENCE TO RELATED APPLICATIONS

This application claims the benefit of and priority to U.S. Prov. Pat. App. Ser. No. 61/686,772 filed Apr. 13, 2012 and entitled "VARIABLE MAGNETIC BINDING SYSTEM FOR BICYCLE PEDAL," the entirety of which is incorporated herein by reference.

BACKGROUND

The bicycle is a common mode of transportation and recreation. A bicycle is powered by a rider, who pushes down on foot pedals to engage a chain that drives the rear wheel. The foot pedal is an important contact point on the bicycle for two reasons. First, the pedal provides the cyclist with stability during riding, and second, it acts as the component through which the cyclist's exertion drives the rear wheel. Therefore, it is important that the pedal provide both of these functions.

A traditional pedal type is the platform pedal. This system is commonly used by many beginning riders, as well as by BMX and downhill riders. The platform pedal provides a stable contact point for the rider to engage the chain. Some pedals have studs on the surface which provide some traction to help keep the rider's feet in place. However, the rider's foot is not mechanically connected to the pedal, and so the rider is only able to supply force during the down stroke. Additional power would be supplied if the rider is able to exert force during both the down stroke and the up stroke.

To this end, a variety of bike pedals assist the rider in securing his feet on the pedal, allowing the rider to supply force during the down and up strokes. A commonly used system is the clipless pedal, which allows for the rider's shoe to mechanically clip into the bike pedal. This system is used by mountain bikers and road cyclists, and allows for greater stability as well as the ability to supply force through the full stroke. Another common system is the toe clip, which is a plastic or metal frame into which the rider's shoe slides for stability. This system is commonly used by riders who want some stability, but are afraid to have the complete fixation that the clipless pedal provides. This system also allows the rider to supply force through the full stroke.

Often a rider who is inexperienced in the usage of clipless pedals will find himself unable to clip out when his bike is falling over. Riders who have clipless pedals can describe their crash experiences when they first were learning to clip out, and have scars to show for it. It is due to this commonality of crashes that there exists a large fear of using clipless pedals among beginner and intermediate riders, notwithstanding the advantages.

What is needed is an intermediate bicycle pedal that features the advantages of the clipless pedals, in that the rider's feet are stably planted on the pedals, and also allow the rider to exert force during both the up and down strokes. At the same time, the pedal should allow the rider to easily and readily disconnect from the pedal to assuage any fears and limitations of releasing from the pedal.

Magnetic pedals have been developed to provide a pedal that allows the rider's feet to be stably planted on the pedal, and also provide enough attraction for the rider to exert force through the full stroke. For example, U.S. Pat. No. 588,038 was an early design for a magnetic bike pedal with a magnet in the bike pedal and a metal plate or magnet attached to a cyclist's shoe. U.S. Pat. No. 5,704,256 discloses a magnetic bike pedal that includes a ramp located on the pedal that allows the cyclist to disengage the magnetic field by using a rotating movement. However, there remains a need for a means to allow a rider to control the degree of magnetic attraction between the pedal and the shoe. What is needed is a magnetic bicycle pedal that can be modified by the rider to fit his changing demands.

BRIEF SUMMARY

In an illustrative embodiment, a variable magnetic binding system is provided, consisting of a pedal that has a cavity, wherein at least one removably insertable magnetic body and/or spacers are positioned. The magnetic body and/or spacers are held in place with a cover sheet. The magnetic body creates a magnetic field that magnetically attracts a shoe piece when the shoe piece is in near proximity. The attractive force between the magnetic body and the shoe piece provide stability when the shoe is mounted on the pedal. The magnetic body and/or the spacers may be adjusted, changed, or modified by the rider, the manufacturer, or a repair shop, in order to increase or decrease the magnetic force according to their preferences. In this way, the user controls the degree of attraction between the shoe and the pedal, depending on preference and comfort level.

Additional and alternative features, advantages, and embodiments of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In addition to the novel features and advantages mentioned above, other objects and advantages of the present invention will be readily apparent from the following descriptions of the drawings and exemplary embodiments, wherein like reference numerals across the several views refer to identical or equivalent features. To provide a better understanding of the advantages and features of the present invention, the following detailed drawings are provided. It should be understood that these drawings depict typical embodiments, and are not intended to be limiting in scope.

FIG. 1C illustrates a perspective exploded view of an exemplary embodiment of the variable magnetic binding system with a pedal, cover sheet, and a shoe piece.

FIG. 1D illustrates a bottom view of a shoe piece shown attached to a cyclist's shoe according to certain embodiments.

DETAILED DESCRIPTION

Figure 1A:
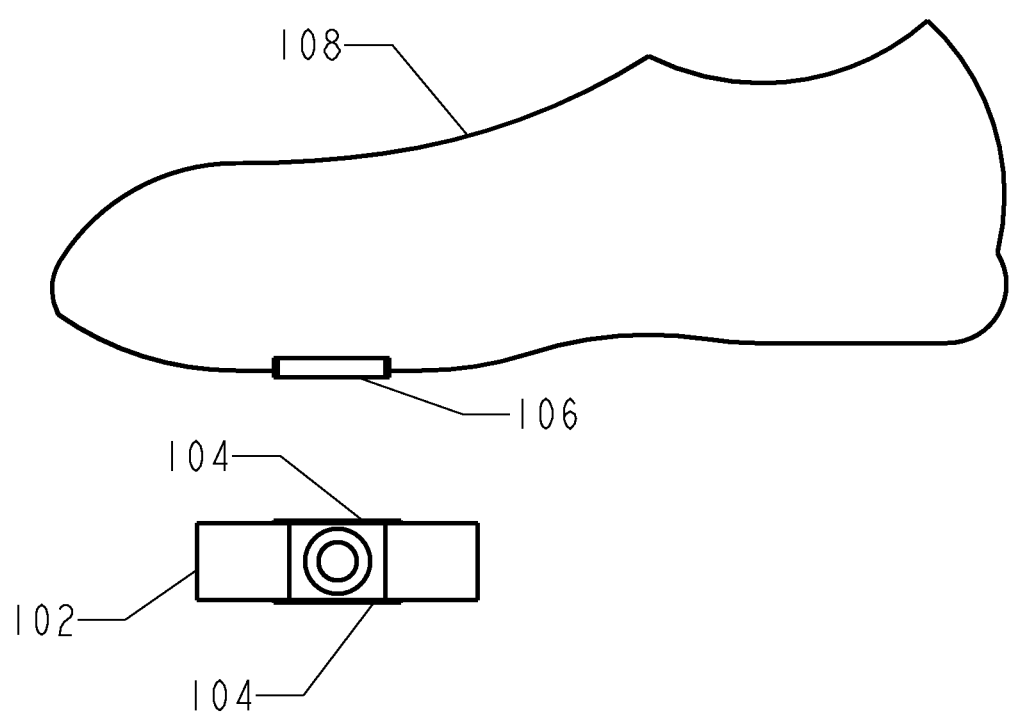
FIG. 1A illustrates the side view of an exemplary embodiment of the variable magnetic binding system with a pedal, a cover sheet, and a shoe piece shown attached to a cyclist's shoe.

At the outset it is noted that although the invention is described in multiple various exemplary embodiments and implementations in this document, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any exemplary embodiments described or shown herein.

In some embodiments, the magnetic binding system bike pedal system provides a unique pedal that may be used to provide fixation of the cyclist's shoe to the pedal. The pedal may be useful for securing the cyclists foot onto the pedal, while at the same time, may allow the cyclist to release from the pedal. This bike pedal system incorporates magnetic bodies to provide a solid connection with the rider's shoe. In some embodiments these magnetic bodies can be easily removed, exchanged, or inserted into the pedal. This may provide the rider with the ability to control the amount of magnetic attraction between the pedal and the shoe by increasing or decreasing the number or strength of magnetic bodies.

In some embodiments, a magnet, such as a neodymium magnet, is inset into a pedal. The magnet is held in place by a cover sheet, which is fastened to the pedal. The cover sheet can vary in thickness, a thinner cover sheet providing a smaller distance between the magnetic bodies and the shoe piece, and thereby increasing the magnetic force. A thicker cover sheet increases the distance between the magnetic bodies and the shoe piece, thereby decreasing the magnetic force between them.

In some embodiments, the force of attraction between the magnets and the shoe piece are strengthened by increasing the contact surface area of the magnet and the shoe piece, or by increasing the thickness of the magnet. By increasing the surface area of the magnet, the attraction force of the magnet increases. Similarly, by increasing the thickness of the magnet, the attraction force increases. Increasing the number of magnets will also result in an increased attraction force. Thus, the attraction force can be modified by changing the magnet diameter, the magnet thickness, and the number of magnets, and combinations thereof. The attraction force of the magnetic binding system can be customized to fit the rider's needs or experience by changing the size, shape, number, or location of the magnets. The variation of the grade and type of magnet can affect the attraction force as well. Not only can the magnets vary between pedal designs, but they can be adjusted within one pedal design by removing, adding, or changing magnets. In other embodiments, the attraction force is adjusted by changing the size, shape, or number of shoe piece(s), or by varying the grade and type of shoe piece material.

In another embodiment, the position of the magnetic bodies can be positionally adjusted within a cavity in the pedal by use of a retaining mechanism, such as a screw, pinching or grasping means, or other similar mechanism known in the art. This allows the rider to increase the magnetic attraction by retainably sliding the magnetic bodies closer to the surface of the pedal, or to decrease the magnetic attraction by retainably sliding the magnetic bodies further from the surface of the pedal at any given time. Thus, the retaining mechanism holds the magnetic bodies in a first position, but the magnetic bodies may translate to a different position when the retaining mechanism is loosened or removed. By changing the position of the magnetic bodies, the portions of the pedal nearest to the magnetic bodies have a greater magnetic field, and therefore more securely hold a shoe piece in position on the pedal. Likewise, the same movement of the magnetic bodies decreases the field on more distant parts of the pedal, permitting a lower level of attraction when desired.

In some embodiments, spacers are removably inserted into the pedal. In some of these embodiments, the spacer may be made of non-magnetic material, such as plastic, aluminum, composite, or ceramic. The spacers may be similar in size and shape to the magnetic bodies, and in such embodiments they may be capable of replacing the magnetic bodies in the pedal. Replacing a magnetic body with a spacer affects the strength of the magnetic field coming from the pedal. For example, in some embodiments, replacing the magnets on one side of the pedal with spacers creates a pedal that has a stronger magnetic force on one side and decreased magnetic force on the other side, thereby providing the rider with a pedal that has two different settings, depending on which side of the pedal is used. In other embodiments, a spacer may be used to replace one or more magnetic bodies inserted into the pedal, decreasing the magnetic field on both sides of the pedal. In other embodiments, the spacer may be used to secure the magnetic bodies in place when they are inserted in the cavity. In yet other embodiments, spacers are strategically placed in the pedal to accommodate different kinds of compatible shoe pieces. For example, if a wide, flat shoe piece is used, spacers may be placed between magnetic bodies to spread the bodies out horizontally in the pedal, and if a thinner shoe piece is used, the spacers may be placed to keep the magnetic bodies in a line perpendicular to the axle of the pedal.

In some embodiments, the magnetic binding system is incorporated into a pedal in such a way that it is functional on both sides of the pedal so that the binding system is functional regardless of which side of the pedal is closest to the rider's shoe.

Attachment methods for magnets in a pedal can vary. The magnets can be encased in the pedal using thin sheets of steel or other compatible materials. In some embodiments, these are referred to as cover sheets. Magnets can also be over-molded into a pedal, adhered in place, or attached by other methods such as the retaining mechanisms referenced above. In an exemplary embodiment, magnets are over-molded into the pedal, and this method of attaching the magnets contributes to protecting the magnets from damage or fracture since the magnets are not exposed on the surface of the pedal. In some embodiments, the magnets may be encased on both sides of the pedal so that the binding system is functional regardless of which side of the pedal is closest to the rider's shoe.

In some embodiments, a clip-compatible biking shoe is affixed to a shoe piece. The shoe piece is comprised of a ferrous material that is magnetically attracted to the magnets in the bicycle pedal. For example, the ferrous material may be selected from the group consisting of iron, cobalt, nickel, neodymium, gadolinium, or mixtures thereof. The cyclist's shoe, with the ferrous shoe piece, is attracted to the magnet inset in the pedal and secured until the rider overcomes the magnetic attraction, which may be done typically by pronating or supinating his foot. The shoe piece is attached to a shoe by an attaching means such as straps, screws, bolts, adhesives, Velcro or other common attaching means. The shoe piece may be attached to a standard clip-compatible biking shoe (e.g. SPD, road biking shoes, BMX, etc.) In some embodiments, the shoe piece is constructed as an integral part of a shoe.

The use of a ferrous shoe piece allows for easy walking, and will not pick up other ferrous materials unlike a magnetic shoe piece.

In some embodiments the shoe piece is made of a flexible magnetic rubber material or of a plurality of ferrous pieces attached to a singular magnetic or non-magnetic flexible rubber. These embodiments provide the shoe with a flexible material that promotes normal gait during walking, providing increased comfort to the rider.

The shoe piece can also be selectively retractable into the sole of the shoe, thus preventing damage to the shoe piece while concomitantly providing the ability to adjust the attractive force between the shoe piece and the magnetic body by increasing or decreasing the distance between the shoe piece and the magnetic body.

The ferrous shoe piece that is attracted to the variable magnetic pedal by magnetic attraction may be kept from moving across the face of the pedal by retaining pieces. In such embodiments the retaining pieces may have a low enough profile to allow for easy removal of the shoe piece, but are deep enough to provide support to the rider's foot to keep the foot properly oriented on the pedal while pedaling.

The methods of holding the shoe piece securely onto the pedal by use of retaining devices can vary widely. In some embodiments a ring-shaped depression is formed in either the shoe piece or the pedal, and a corresponding ring-shaped extension or ridge is formed on the part without the depression. In these embodiments, the ring shapes fit together and help to keep the cyclist's foot properly oriented on the pedal. In other embodiments, a ring-shaped ridge is formed on the surface of the shoe piece or the pedal, and a peg extension on the respectively corresponding pedal or shoe piece is shaped to fit within the ring-shaped ridge.

In another embodiment, screws, bolts, and/or studs extend out of the bike pedal face. These screws, bolts, and/or studs are situated to keep the shoe piece properly oriented on the pedal when located the cyclist's foot places the screws, bolts, and/or studs in connection with corresponding holes or depressions in the shoe piece.

In yet other embodiments, the shoe pieces are retained, and easy removal of the shoe piece from the pedal is facilitated, by incorporation of angled surfaces. These angled surfaces aid in locating the shoe piece. For example, the retaining ring may have a chamfered inner diameter, so that the shoe piece is guided more easily into place. The retaining piece(s) may include other designs that prevent the shoe piece from sliding off the pedal.

Additional components of some embodiments of the bike pedal include a pedal body, a threaded steel shaft, bearings, and seals. The threaded steel shaft runs through the middle of the pedal body and screws into the bicycle crank arm. The threaded steel shaft sits inside the bearings, which allow the pedal to spin smoothly. The seals prevent dirt and debris from entering bearings.

The magnetic binding system provides safety features and ease of use. Unlike existing clipless pedals, which can be difficult or unnatural to release the cyclist's foot when stopped or falling, when a rider with magnetic pedals is falling over, the natural pronation or supination of his feet will cause his feet to automatically release. In some embodiments, the non-mechanical interaction of the shoe piece and pedal allow the rider's feet to freely twist. This can help avoid adverse side effects on the rider's joints and muscles due to restricted biomechanical movements while pedaling.

The magnetic binding system is easy to use because the attractive magnetic forces between the pedal and shoe cause the foot to automatically "clip in," and aid in quickly locating the center of the binding system. This design feature is useful to riders who are in a difficult situation that requires the ability to clip into the pedal quickly, such as when a biker is trying to start pedaling on a steep uphill. Clipless pedals can be difficult to clip into and often require some movement of the foot to find the exact spot where the shoe can clip in. Additionally, in some embodiments there is no need to learn how to twist the shoe piece in the correct manner so that it clips out of the pedal—the rider simply has to overcome the magnetic attraction of the pedal to break his foot free.

Additionally, the variable magnetic binding system provides the rider with the ability to determine the amount of attractive force that the pedal will exert on the shoe piece. Thus, the rider will be able to ride at an adequate comfort level, and the pedal allows for the rider to adjust or increase the strength of the attraction as experience grows. In some situations, the user may select the magnetic attraction strength of the pedal by configuring the pedal to have a greater magnetic field on one side in comparison to the other.

The design of the magnetic binding system is not limited to the design described above. The magnetic binding system has many alternate designs. For example, the size, shape, number, and location of the magnets and/or spacers and shoe piece can vary. The grade and type of magnets used can include, for example, other permanent magnets or electromagnets. The type of material used for the shoe piece can include any magnetically attracted material, for example, metal, composite, ceramic, or combinations thereof. Moreover the shape of these components can also vary. The magnets could be rectangular, circular, or another shape. The shoe piece could be rectangular, cylindrical, hexagonal, or another shape.

The magnetic binding systems and methods disclosed herein are not limited to use in bike pedals only. They can also be used in any situation where a binding system is needed or could be useful, such as, for example, in ski bindings, snowboarding, wakeboarding, or any other activity or application where a connection of the feet to an object is helpful.

This unique bike pedal with a magnetic binding system provides a safe and simple alternative to the bicycle pedals that are currently on the market. It greatly reduces the dangers of being unable to clip out when falling over on a bike. It also is simple to use, even for intermediate or beginner bike riders.

Embodiments of the bicycle pedal connection system herein provide a means for a cyclist to stably mount onto a bicycle by providing magnetic attraction between the shoe and the pedal. Through this same magnetic attraction, the cyclist may provide increased force during pedaling, during both his down stroke and his up stroke. In some embodiments, the variable magnetic pedal allows the cyclist to determine the amount of magnetic force between the rider and the bicycle by allowing variable numbers of magnets to be inserted into the pedal, depending on the cyclist's preference and experience.

A notable aspect of some embodiments of the magnetic pedal system disclosed herein is the ability of the user, whether the user is a cyclist, a repair shop, or a manufacturer, to pre-determine or designate the number and location or position of the magnets placed in the pedal. This variability provides different degrees of attractive force, thus accommodating the rider's skill level or personal preference for the amount of attractive force to be present between the shoe and the pedal. The invention is to be further understood by reference to the figures below.

Referring now to the figures in detail, in FIG. 1A, a variable magnetic binding system is shown, including a variable magnetic bicycle pedal 102 with attached cover sheet 104. A corresponding shoe piece 106 is shown attached to the bottom of a shoe 108.

Figure 1B:
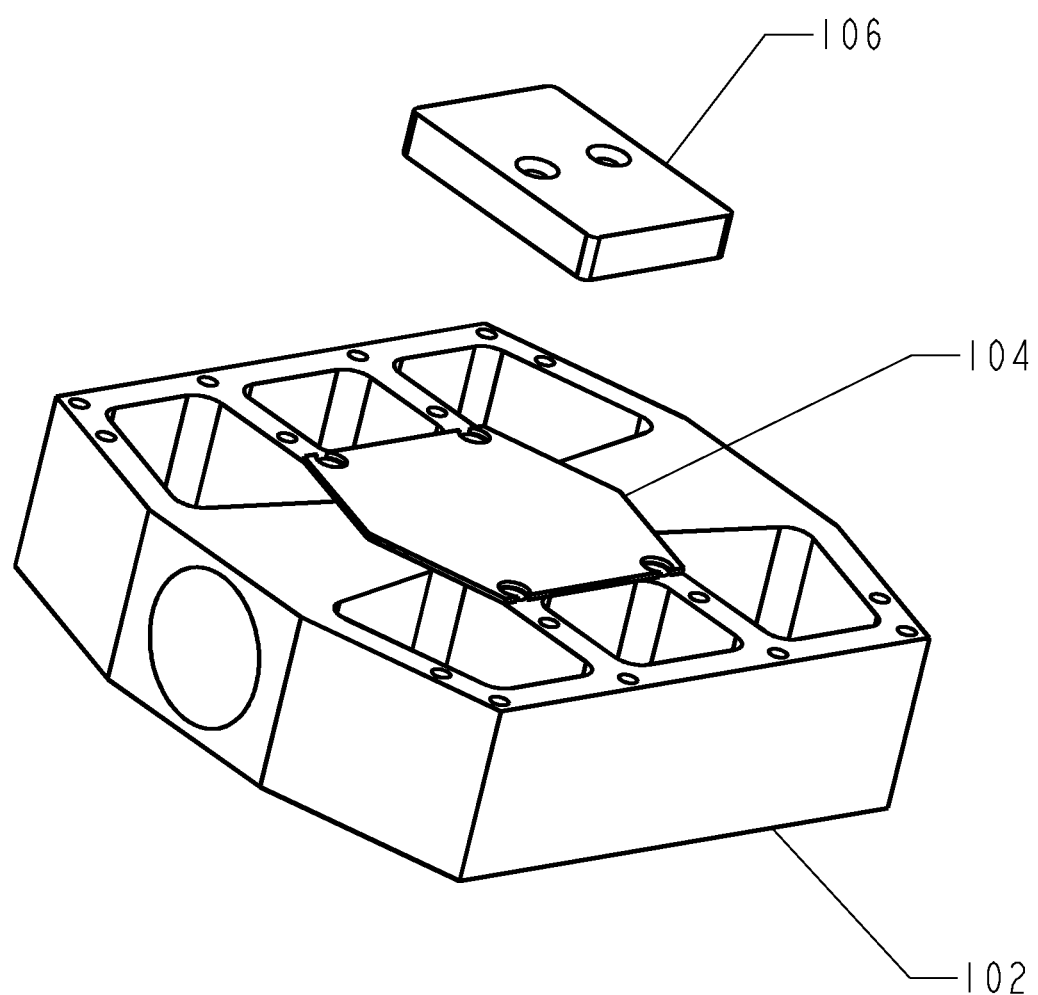
FIG. 1B illustrates a perspective view of an exemplary embodiment of the variable magnetic binding system with a pedal, cover sheet, and a shoe piece.

In FIG. 1B, one embodiment of the variable magnetic binding system is shown, and includes a pedal 102, thin cover sheet 104, and a shoe piece 106. The pedal 102 is made of any commonly used material for pedals, including aluminum, magnesium, plastics, combinations thereof, and other materials used in the art. The pedal 102 has a main body having outer surfaces. In some embodiments the outer surfaces are the upper and lower surfaces of the pedal contacted by the cyclist's foot. In other embodiments, the outer surfaces additionally include the front, back, and side surfaces of the pedal. In yet further embodiments the outer surfaces include surfaces on the walls of holes or cavities in the pedal body.

FIG. 1C shows an exploded view of this embodiment. In this embodiment, cylindrical magnetic bodies 112 are inserted into corresponding cylindrical cavities 120 within the pedal 102. The magnets 112 are held in place by a thin cover sheet 104, which is fastened to the pedal 102. Attached to the shoe is a shoe piece 106 that is attracted to the magnetic field generated by the magnets 112. The cover sheet 104 is placed on both sides of the pedal 102 to keep the cylindrical magnets 112 in place.

In this embodiment, the pedal 102 is capable of retaining six cylindrical magnetic bodies 112. However, the pedal 102 does not necessarily require that six magnets 112 are installed. The rider or manufacturer can at his preference insert the desired number of magnets 112 into the cavities 120 within the pedal 102 to thereby increase the magnetic attraction by increasing the number of magnets 112 in the pedal 102, or decrease the magnetic attraction by decreasing the number of magnets in the pedal. Thus, the amount of magnetic attraction can be adjusted to suit the experience, comfort level, and/or preference of the rider. Furthermore, the amount of magnetic attraction can be adjusted over time to suit the changing needs of the rider by either increasing or decreasing the number of magnets 112 inserted into the cavities 120. In some embodiments, the magnets 112 can be shorter in length, such that several magnets 112 can stack into a single cavity 120. The cylindrical magnets 112 shown in FIG. 1C are an exemplary embodiments. In other embodiments they may take other shapes, including but not limited to cylindrical, ellipsoidal, and polygonal. They may be of other quantities, including any quantity greater than or equal to one magnet. They may take other sizes as well. In other embodiments, the pedal body is magnetic or has built-in magnetic elements, and the magnetic bodies (e.g., 112) are added to supplement the innate magnetic properties of the pedal.

The cavities 120 in the pedal 102 are not limited to the illustrative embodiment in FIG. 1C. The cavities 120 are the location in the pedal 102 wherein the magnets 112 may be inserted and secured in the pedal body. Other abscesses may be present in the pedal 102, for example to reduce weight, or allow for moisture and dirt to pass through the pedal 102. However, the cavities 120 in this embodiment are specifically introduced to provide a location for insertion of the magnets 112 into the pedal 102. The cavities 120 can extend through the entire depth of the pedal 102, creating holes or other continuous passages through the pedal 102. Alternatively, the cavities 120 can be caved cavities in the pedal 102, having side walls and only a single opening on one side, as shown in further detail in connection with FIG. 3B. In such embodiments, a single cover sheet 104 can be used to cover the opening of the cavities after the magnets 112 are inserted. Furthermore, the cavities 120 in some embodiments correspond in size and shape to the magnets 112, but in other embodiments the cavities are larger in size than the magnets 112, and different in shape. In some embodiments, the cavities 120 can vary in number and shape, in order to accommodate greater or fewer magnets 112 and/or magnets 112 of different shape. In this embodiment, the magnets 112 are inserted into the cavities 120 and retained in place by use of a cover sheet 104. A cavity may be located at the center of the face of a pedal to orient the foot of the rider to the center of the pedal body, or may be offset to the side of the pedal or offset on the face of the pedal to accommodate other styles of foot positions and to change the source of the magnetic field. For example, if the cavity and magnetic bodies contained therein are offset toward the outside portion of the pedal, there is decreased change of foot interference with the crank of the bicycle. If the cavities are positioned toward the front and back of the pedal, there is more space within the pedal for the axle and there may additionally be more space available for additional cavities due to the non-interference with the axle.

The cover sheets 104 are exemplary embodiments. The cover sheet 104 is fastened to the pedal using screws, bolts, studs, other common fastening means, or combinations thereof. The cover sheet 104 is used to retain the magnets 112 within the cavities 120 of the pedal 102, and to protect the magnets 112. However, cover sheets 104 are not required where the magnets 112 can be retained within the pedal 102 and protected from damage, such as, for example, by the use of a clamshell pedal that clamps down on the magnets 112 or an embodiment where the magnetic bodies are constructed with threaded surfaces that can be twisted into the pedal body in a screw-like fashion. In other embodiments the cover sheet 104 may be of other shapes, including but not limited to circular, ellipsoidal, and polygonal. The cover sheet 104 may wrap to cover the sides of the pedal 102, the opposite face, or fully around the pedal. The cover sheet 104 may be located at the center of the face it is intended to cover, or offset to one side of the face. The cover plate 104 may be of other sizes, for example, a cover plate which covers part or all of the foot-facing surface of the pedal. The magnets 112 may be captured or connected to the pedal by other means, including but not limited to fastening to the pedal, encapsulating within a pedal of clamshell design, or molded into a shape that removably fits into the pedal.

In the embodiment shown in FIG. 1D, the shoe piece 106 is attached to the bottom of a shoe 108 by attachment means. The attachment means includes fastening the shoe piece 106 to the bottom of the shoe 108 with screws, adhesives, Velcro, rivets, bolts, straps, over molding, or other common attachment means. The shoe piece 106 is made from a magnetically attracted material, such as, for example, metal, composite, ceramic, or combinations thereof.

Figure 2A:
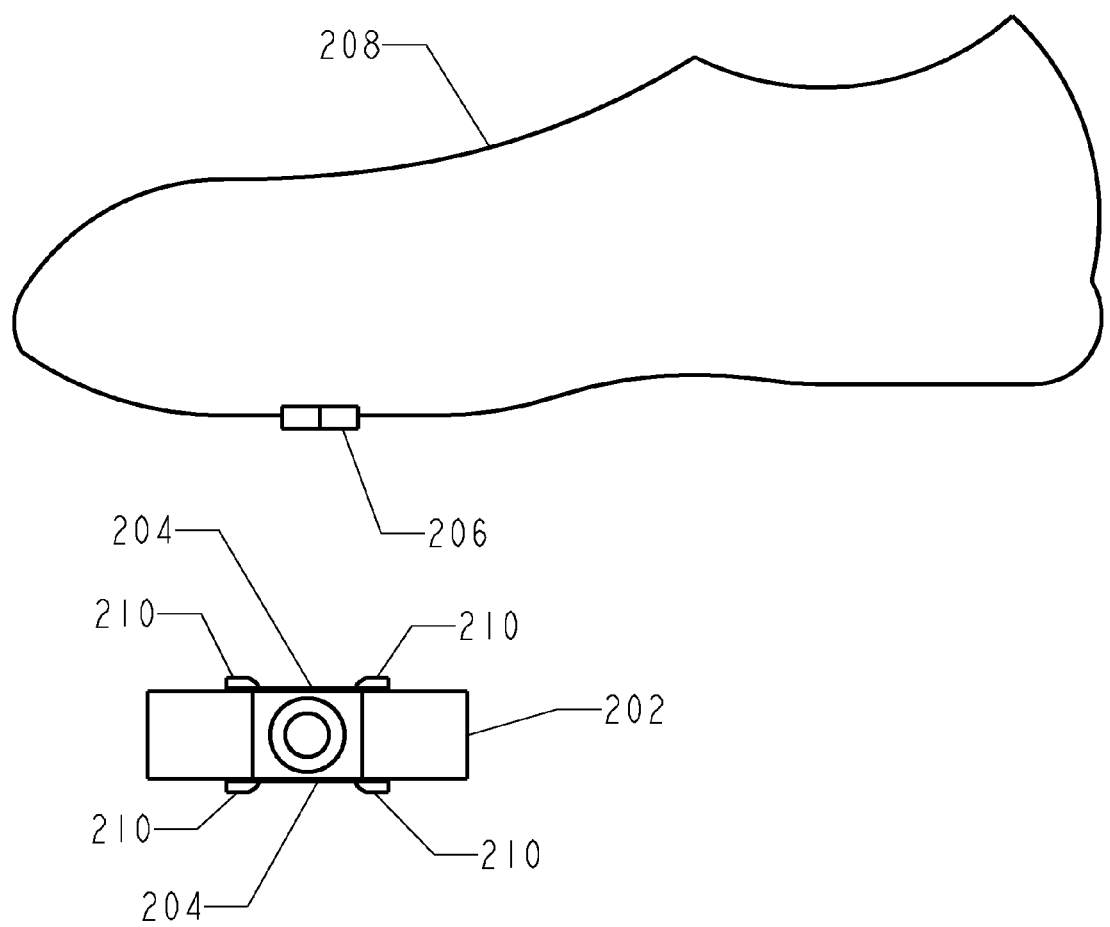
FIG. 2A illustrates a side view of another embodiment of the variable magnetic binding system, depicting a pedal with magnets having retaining pieces and cover sheets, and a shoe piece attached to a shoe.
Figure 2B:
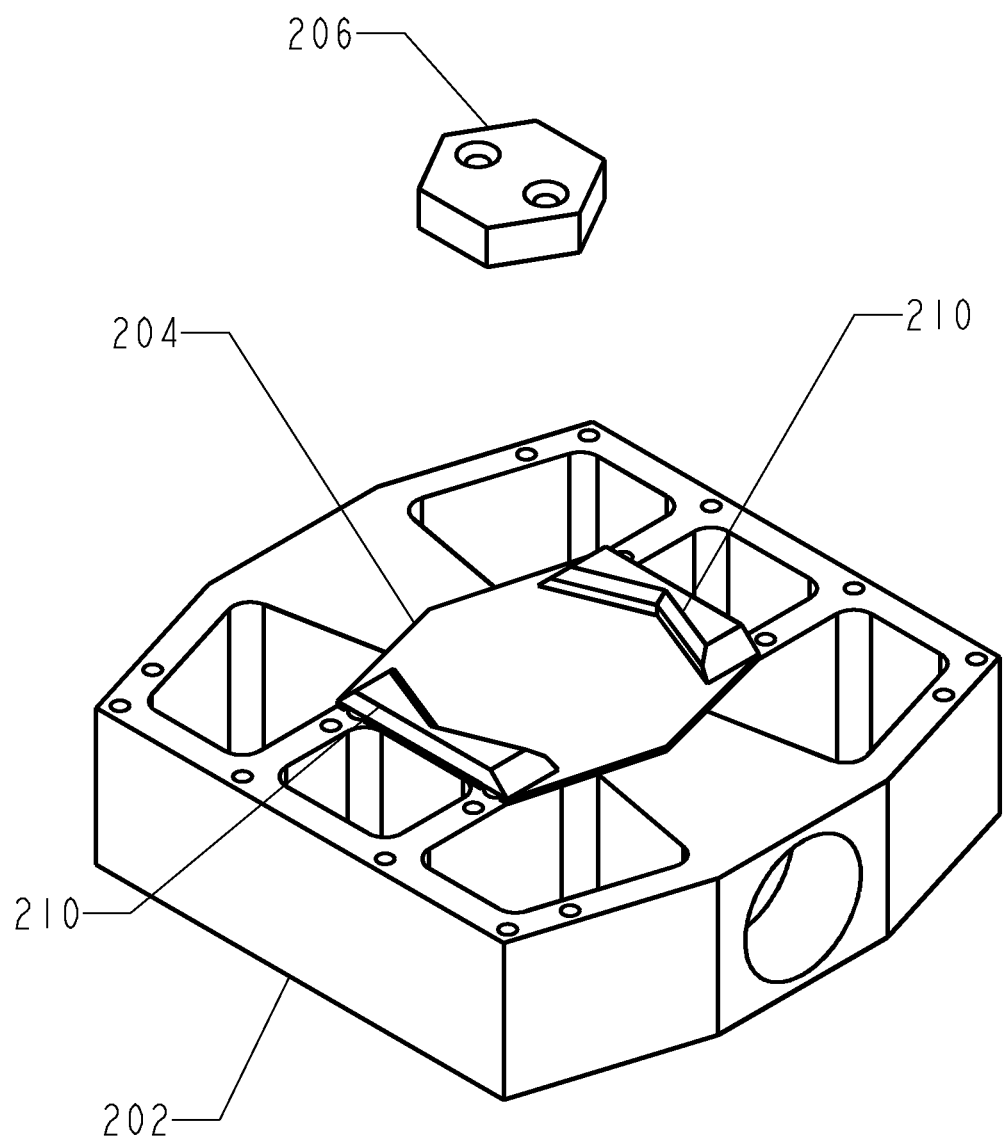
FIG. 2B illustrates a perspective view of an embodiment of the variable magnetic binding system, depicting a pedal with magnets having retaining pieces and cover sheets, and a shoe piece.

Referring to FIGS. 2A and 2B, in another embodiment of the variable magnetic binding system, the pedal 202 has retaining pieces 210 that correspond in size and shape to the shoe piece 206 that is attached to the bottom of a shoe 208. The retaining pieces 210 provide added enclosure for the shoe piece 206, so that the attractive force of the magnets within the pedal 202 is combined with the retaining pieces 210 to provide stability in the placement of the shoe 208. The magnets are retained within the pedal 202 with a cover sheet 204 that can be placed on the top, bottom, or both sides of the pedal 202. The retaining pieces 210 are placed on the top, bottom, or both sides of the pedal 202 for convenience to the cyclist.

Figure 2C:
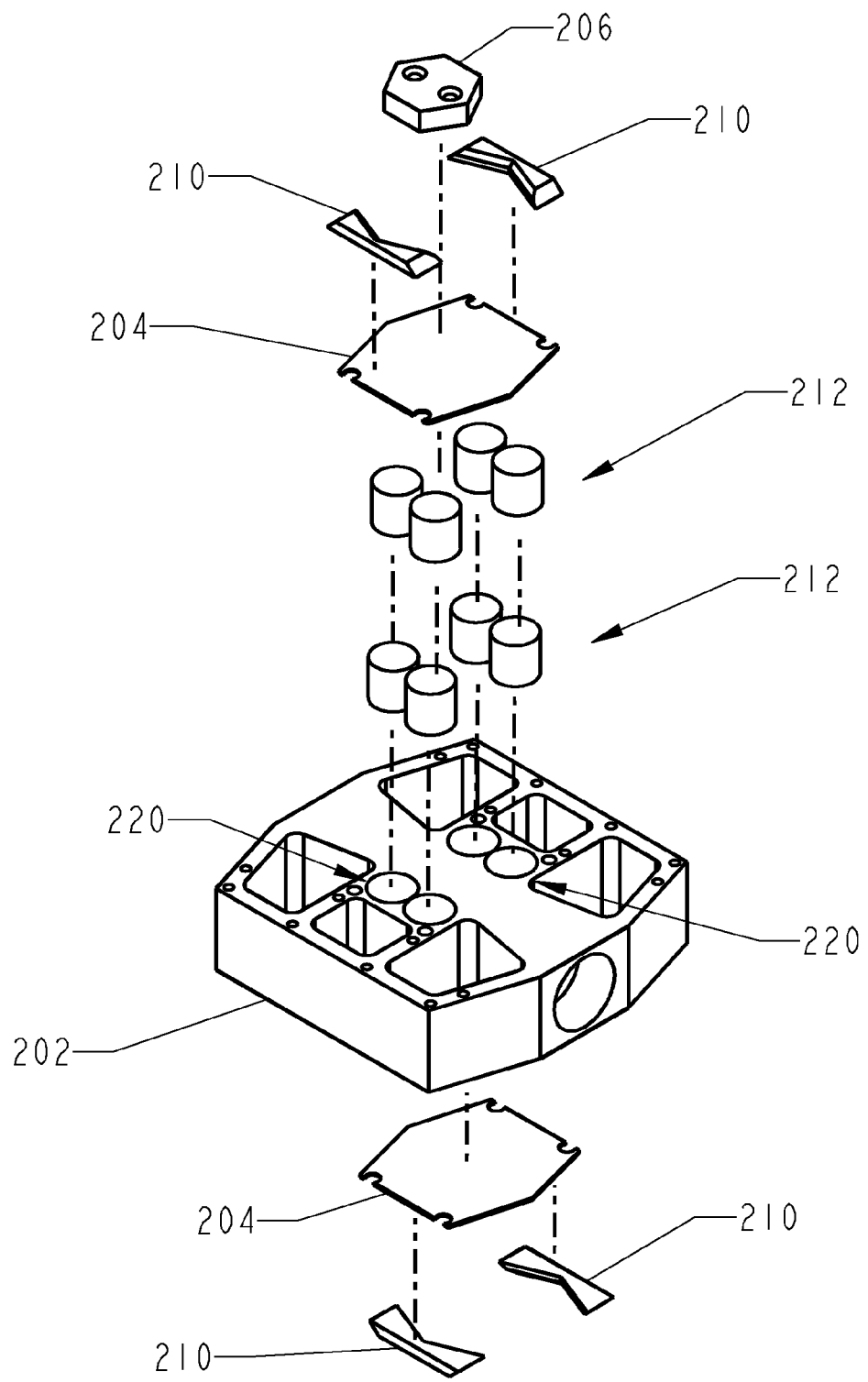
FIG. 2C illustrates a perspective exploded view of an embodiment of the variable magnetic binding system, depicting a pedal with magnets having cover sheets and retaining pieces, and a shoe piece.

Referring to FIG. 2B in another embodiment the variable magnetic binding system is shown having a pedal 202, retaining pieces 210 on the pedal 202, cover sheet 204, and a corresponding shoe piece 206. FIG. 2C depicts an exploded view of this embodiment. In this embodiment, the magnets 212 are different in size and arrangement, as compared to the embodiment shown in FIGS. 1A, 1B, and 1C. Eight cylindrical magnets 212 are stacked into corresponding cylindrical cavities 220 within the bike pedal 202. The magnets 212 are held in place by a thin cover sheet 204, which is fastened to the pedal 202. In this embodiment, two retaining pieces 210 are mounted on the outer faces of the cover sheets 204. The retaining pieces 210 correspond in shape to the shoe piece 206 that is attached to the cyclist's shoe. The cover sheets 204 are placed on both sides of the pedal 202 to prevent the magnets 212 from being dislodged. The retaining pieces 210 are placed on both sides of the pedal 202 so that the cyclist does not have to differentiate which side of the pedal 202 to place the foot.

Retaining pieces may be attached to cover sheets as shown in this embodiment, but in other embodiments, retaining pieces are attached to or an integral part of the main pedal 202.

Figure 3A:
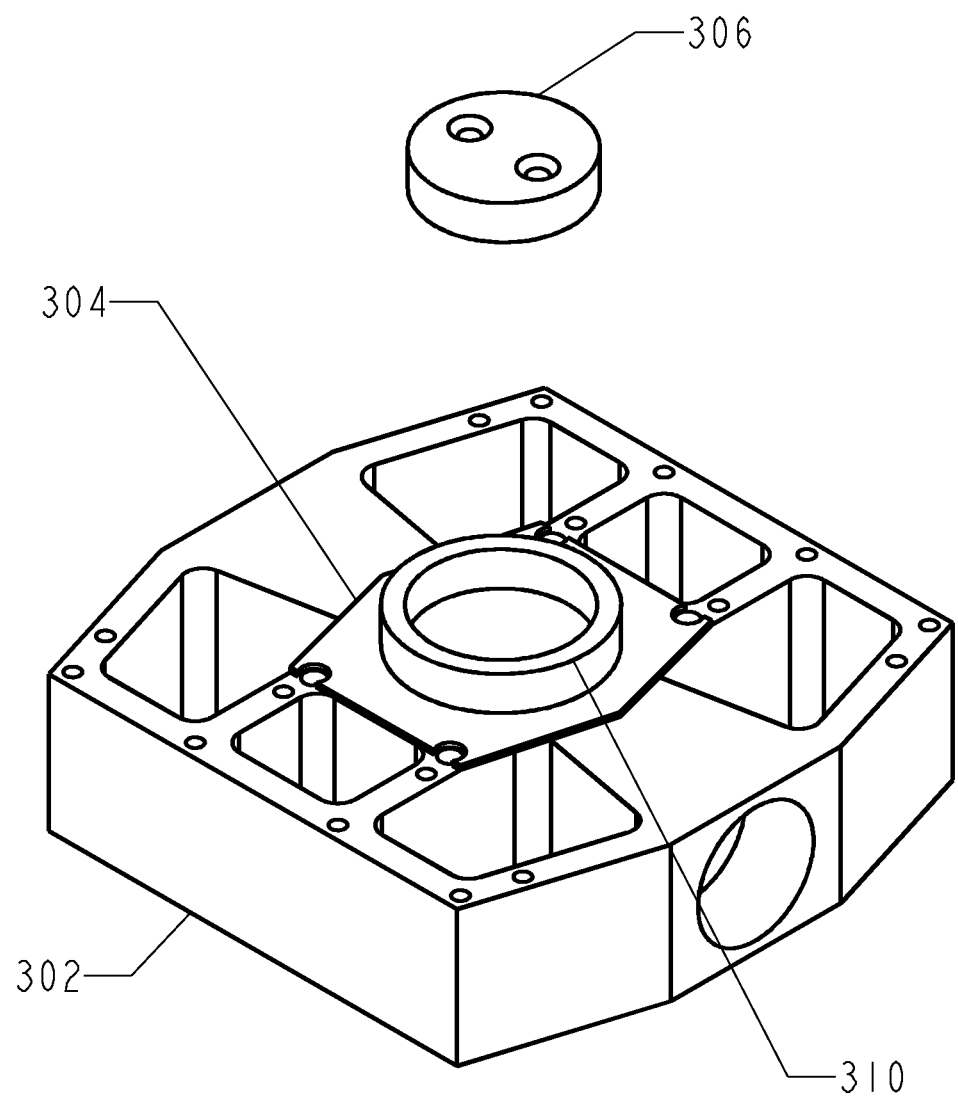
FIG. 3A illustrates a perspective view of another embodiment of the variable binding magnetic system, depicting a pedal with magnets having cover sheets and a retaining piece, and a corresponding shoe piece.
Figure 3B:
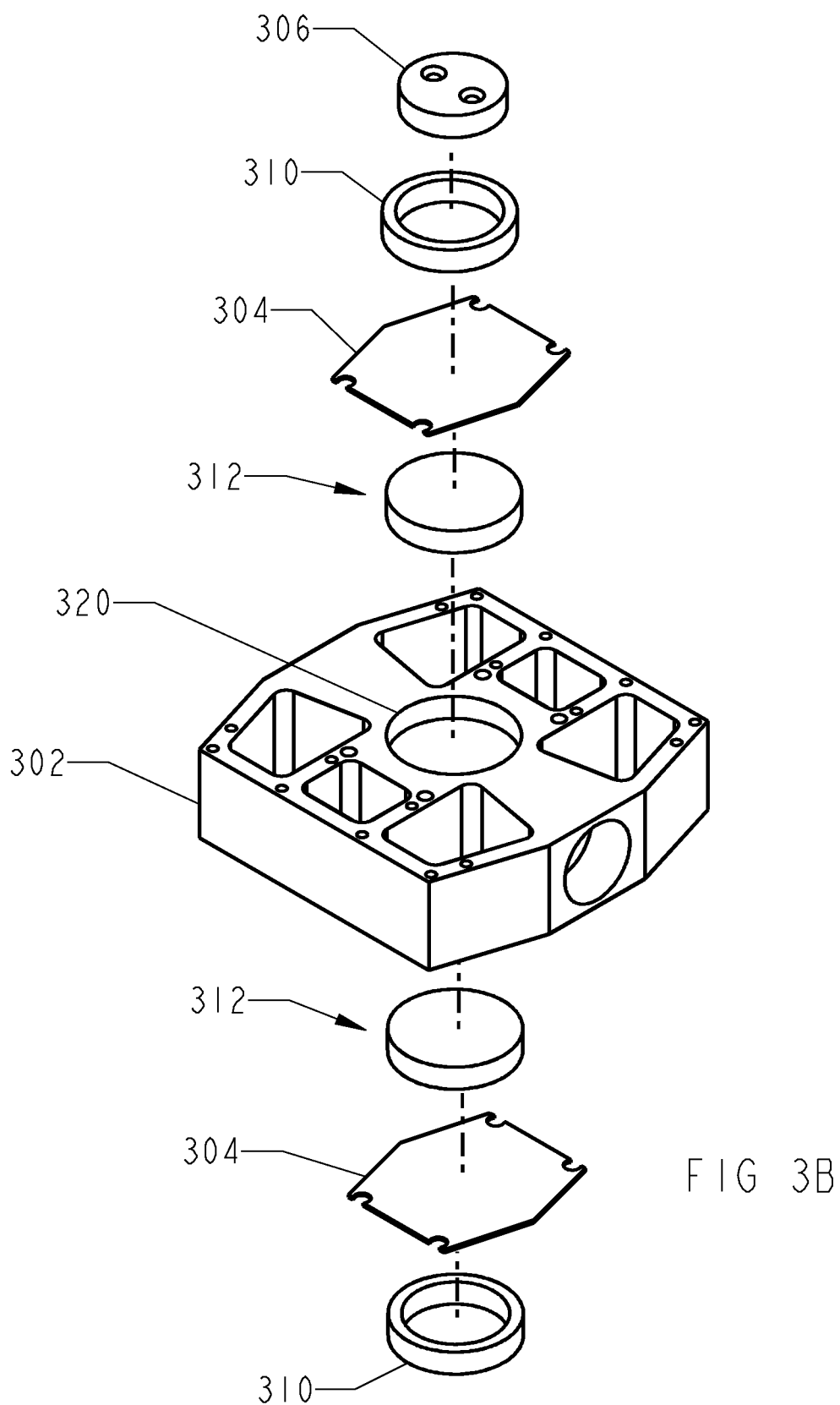
FIG. 3B illustrates a perspective exploded view of an embodiment of the variable binding magnetic system depicting a pedal with a centrally located magnet having a cover sheet and a retaining piece, and a corresponding shoe piece.

Referring to FIGS. 3A and 3B, in another embodiment of the present invention, a single center magnet 312 is placed within a corresponding cavity 320 in both the top and the bottom side of the pedal 302. The cavity 320 in this embodiment does not go through the entire depth of the pedal 302. The magnets 312 are held in place by a thin cover sheet 304, which is fastened to the pedal 302. Atop the cover sheet 304 is a ringed retaining piece 310, which corresponds in shape to a shoe piece 306 located in the shoe. The cover sheet 304 is placed on both sides of the pedal 302 to prevent the magnets 312 from being dislodged. The retaining piece 310 may be also attached on both sides of the pedal 302 so that the cyclist does not need to differentiate which side of the pedal to place the foot. In this and other embodiments, the shape of the shoe piece 306 and retaining piece 310 may be reversed, so that, for example, in this embodiment, the ring shape is on the shoe and the peg-shape is on the pedal.

Figure 4A:
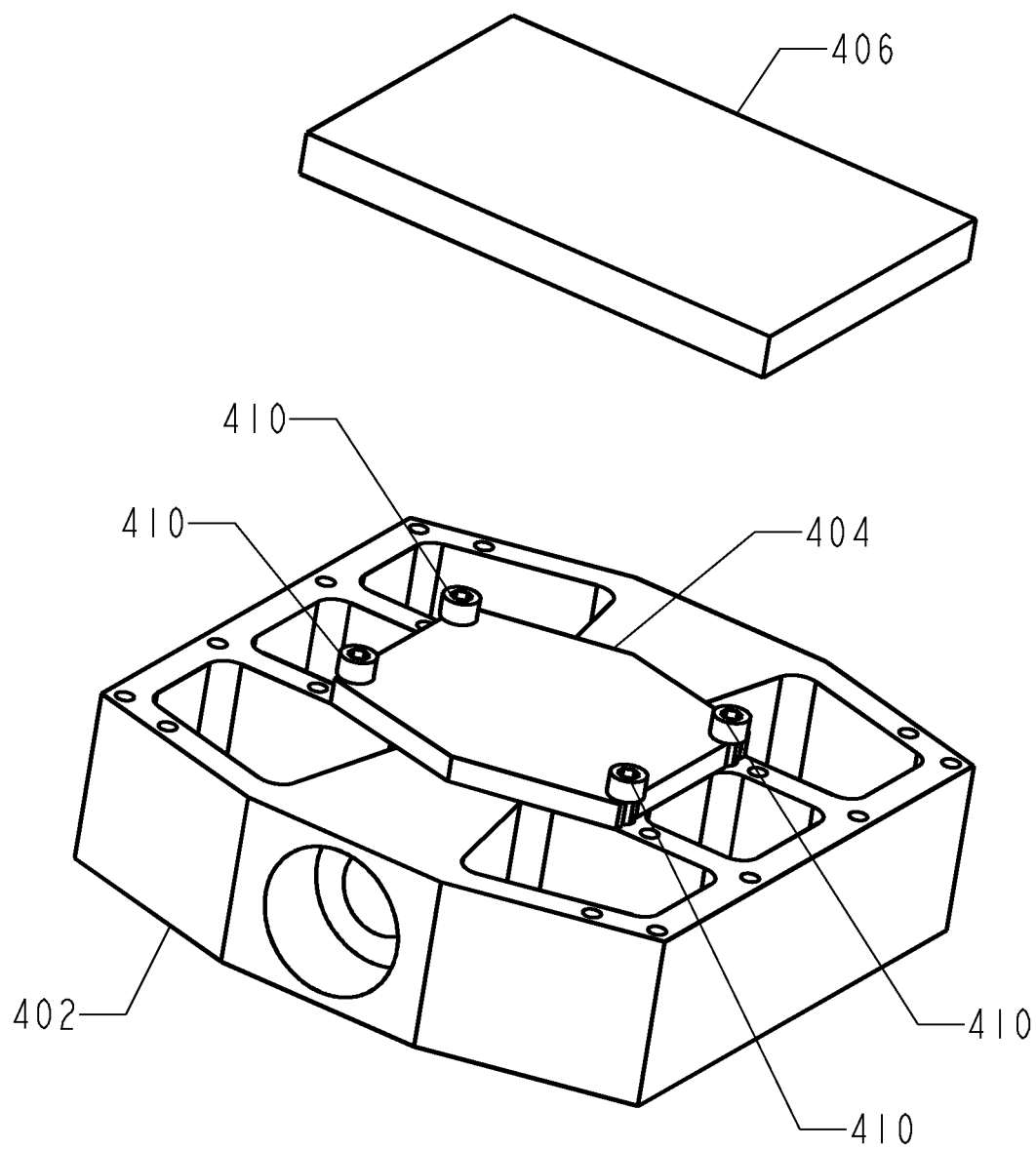
FIG. 4A illustrates a perspective view of another embodiment of the variable magnetic binding system, depicting a pedal with spacers and/or magnets having thicker cover sheets and fasteners shown, and a shoe piece.
Figure 4B:
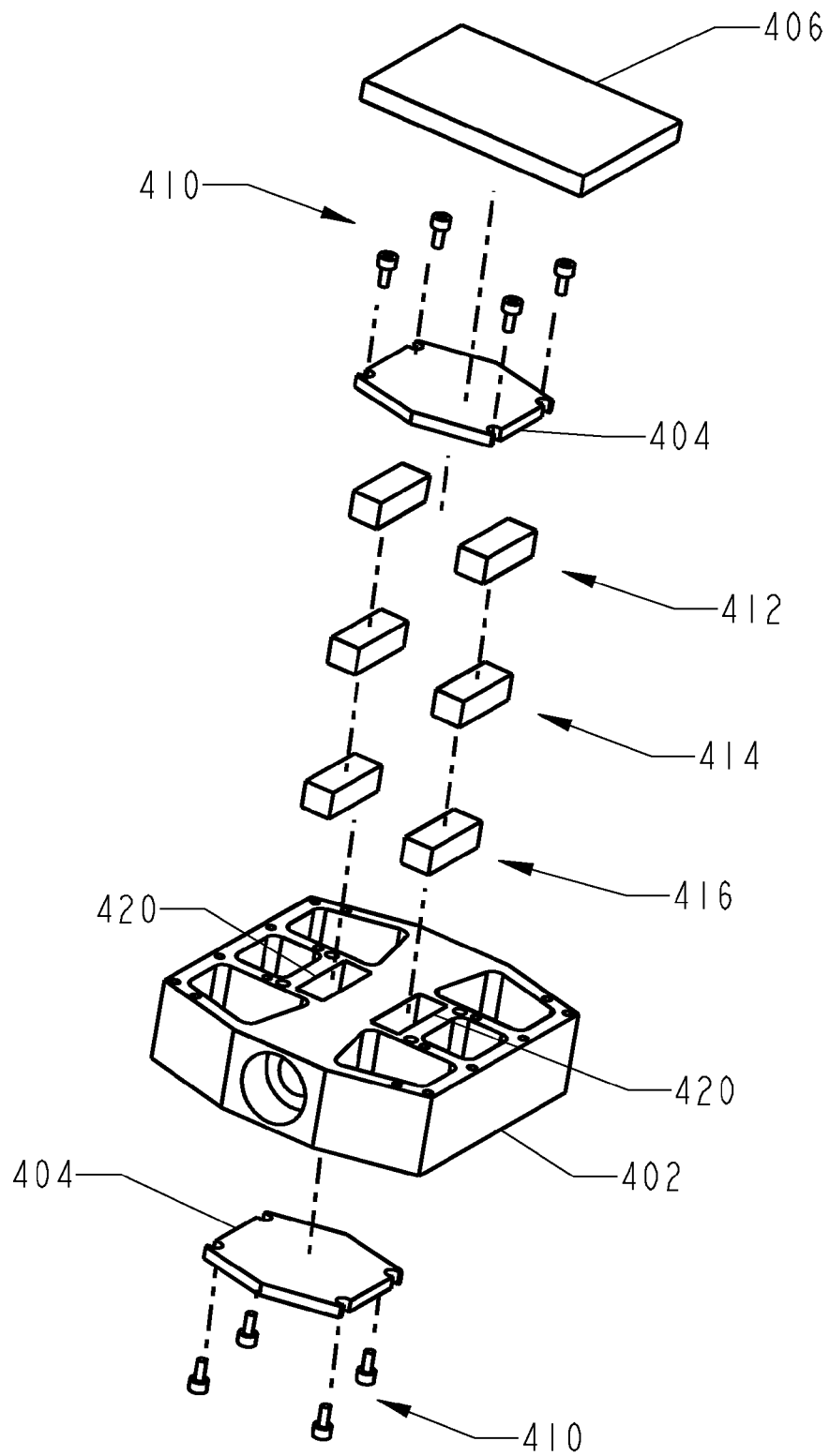
FIG. 4B illustrates a perspective exploded view of an embodiment of the variable magnetic binding system, depicting a pedal with spacers and/or magnets, thicker cover sheets, fasteners, and a shoe piece.

Referring to FIG. 4A in another embodiment the variable magnetic binding system is shown having a pedal 402, retaining pieces 410 on the pedal 402, a thickened cover sheet 404, and a corresponding shoe piece 406 composed of flexible magnetic rubber. FIG. 4B depicts an exploded view of this embodiment. In this embodiment, the polygonal objects 412, 414, and 416 represent magnets or spacers, as selectively determined in order to increase or decrease the magnetic attractive force of the pedal. The magnets or spacers 412, 414, and 416 are different in size and arrangement, as compared to the embodiment shown in FIGS. 1A, 1B, and 1C, illustrating that the magnetic bodies in these embodiments may vary as determined appropriate by the manufacturer or user. Six polygonal magnets or spacers 412, 414, and 416 are stacked into corresponding polygonal cavities 420 within the bike pedal 402. The magnets or spacers 412, 414, and 416 are held in place by a thickened cover sheet 404, which is fastened to the pedal 402. In this embodiment, four retaining pieces 410 that are represented by cap screws are mounted to secure the cover sheets 404 to the pedal 402. The retaining pieces 404 do not correspond in shape to the shoe piece 406 that is attached to the cyclist's shoe. The cover sheets 404 are placed on both sides of the pedal 402 to prevent the magnets or spacers 412 from being dislodged. The retaining pieces 410 are placed on both sides of the pedal 402 so that the cyclist does not have to differentiate which side of the pedal 402 to place the foot.

In this embodiment, the user may selectively change the magnetic strength of the pedal. For example, the polygonal pieces 412, 414, and 416 may all be magnets, and the user may choose to insert stronger or weaker magnets to adjust the strength of the pedal. The user may also choose to place magnets as the outer pieces 412 and 416 and spacers as the inner pieces 414, weakening the magnetic attraction of the pedal in comparison to an all-magnet configuration. The vice-versa configuration, where the outer pieces are spacers and the inner pieces are magnets, would weaken the magnetic attraction even further. In another configuration, pieces 412 are magnets, and the remaining pieces 414 and 416 are spacers, giving the pedal asymmetrical magnetic strength. Other configurations are also possible, as will be known to the skilled artisan in extension of this description.

Figure 5:
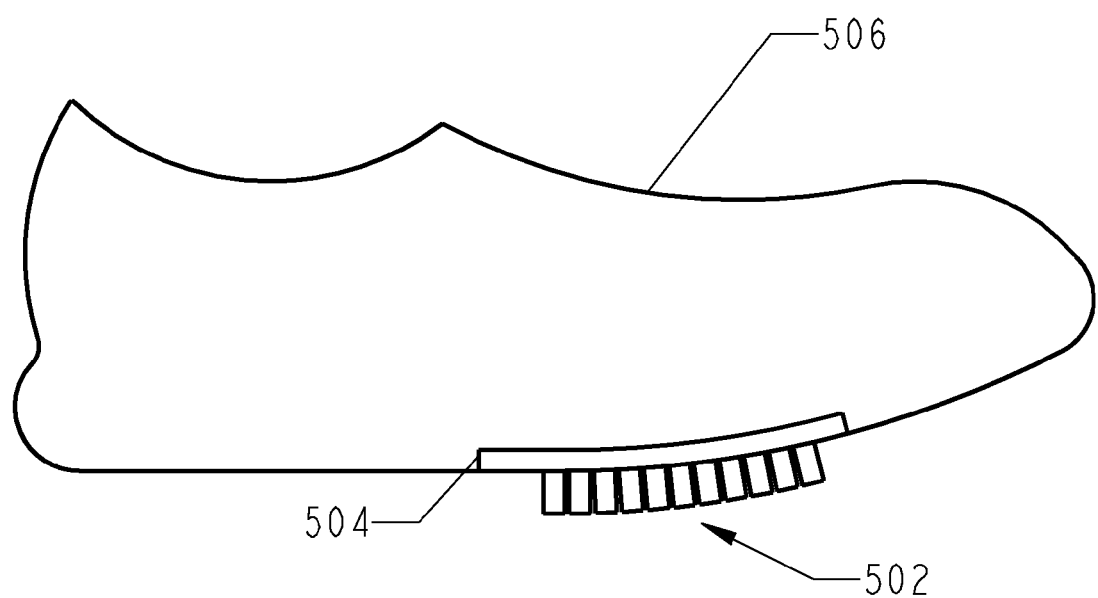
FIG. 5 illustrates a side view of an embodiment of a shoe piece, depicting a flexible shoe piece attached to a shoe.

As shown in FIG. 5, a shoe piece may be made from a plurality of magnetically attracted materials 502, such as, for example, magnets, metal, composite, ceramic, or combinations thereof. The plurality of magnetically attracted materials 502 that makes up the shoe piece is connected by a flexible material 504. The magnetically attracted material connected with a flexible material make up a shoe piece 502 that is attached to the sole of a shoe 506. The resulting flexible shoe piece 502 permits the cyclist to easily walk during normal gait with the shoe 506. It also permits the cyclist to bend or flex his foot more freely and naturally when he pulls his foot away from a magnetic pedal.

Figure 6A:
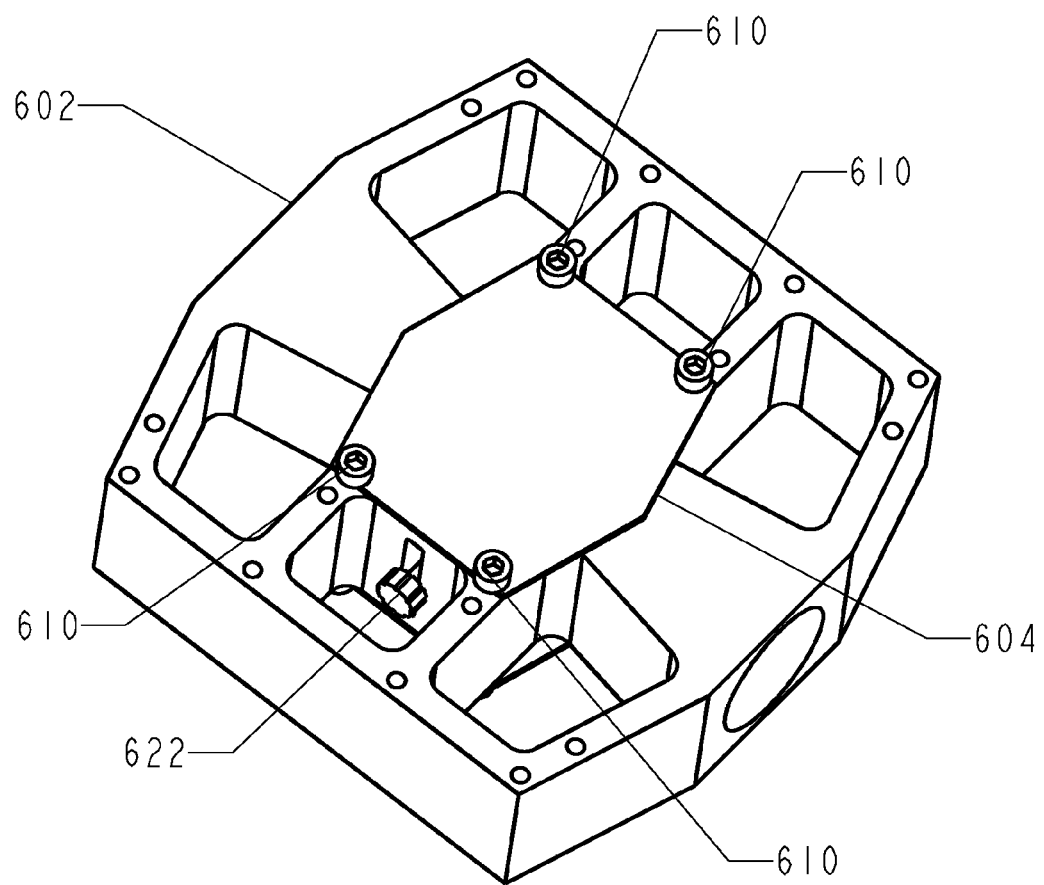
FIG. 6A illustrates a perspective view of another embodiment of the variable magnetic binding system, depicting a pedal with magnets having a cover sheet and sliding knobs for adjusting the location of the magnets inside the pedal.
Figure 6B:
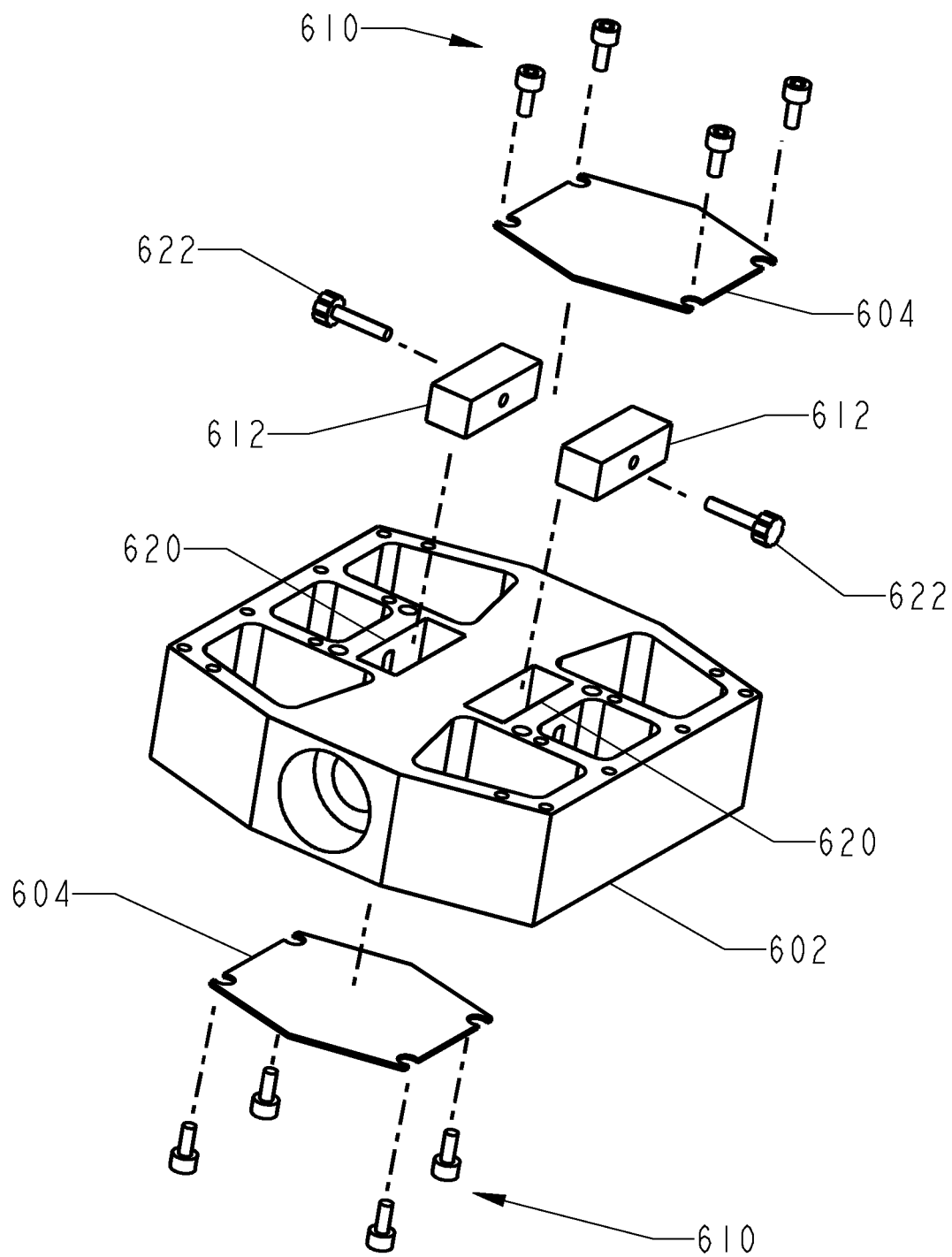
FIG. 6B illustrates a perspective exploded view of an embodiment of the variable magnetic binding system, depicting a pedal having a cavity, magnets, cover sheets, fasteners, and sliding knobs.

Referring to FIG. 6A, in another embodiment the variable magnetic binding system is shown having a pedal 602, retaining pieces 610 on the pedal 602, a cover sheet 604, and a sliding knob 622. FIG. 6B depicts an exploded view of this embodiment. In this embodiment, two polygonal magnets 612 are stacked into corresponding polygonal cavities 620 within the bike pedal 602, and a sliding knob 622 is attached to the magnets 612. The sliding knob may be externally adjusted by the cyclist toward or away from one of the surfaces of the pedal 602 in order to increase or decrease the attract force, respectively. The magnets 612 are held in place by a cover sheet 604, which is fastened to the pedal 602. In this embodiment, four retaining pieces 610 that are represented by cap screws are mounted atop the cover sheet 604. In this embodiment the cover sheets 604 placed on both sides of the pedal 602 are not necessary to prevent the magnets 612 from being dislodged, as the magnets 612 have been affixed to the pedal by an alternative method. The retaining pieces 610 are placed on both sides of the pedal 602 so that the cyclist does not have to differentiate which side of the pedal 602 to place the foot.

Figure 7A:
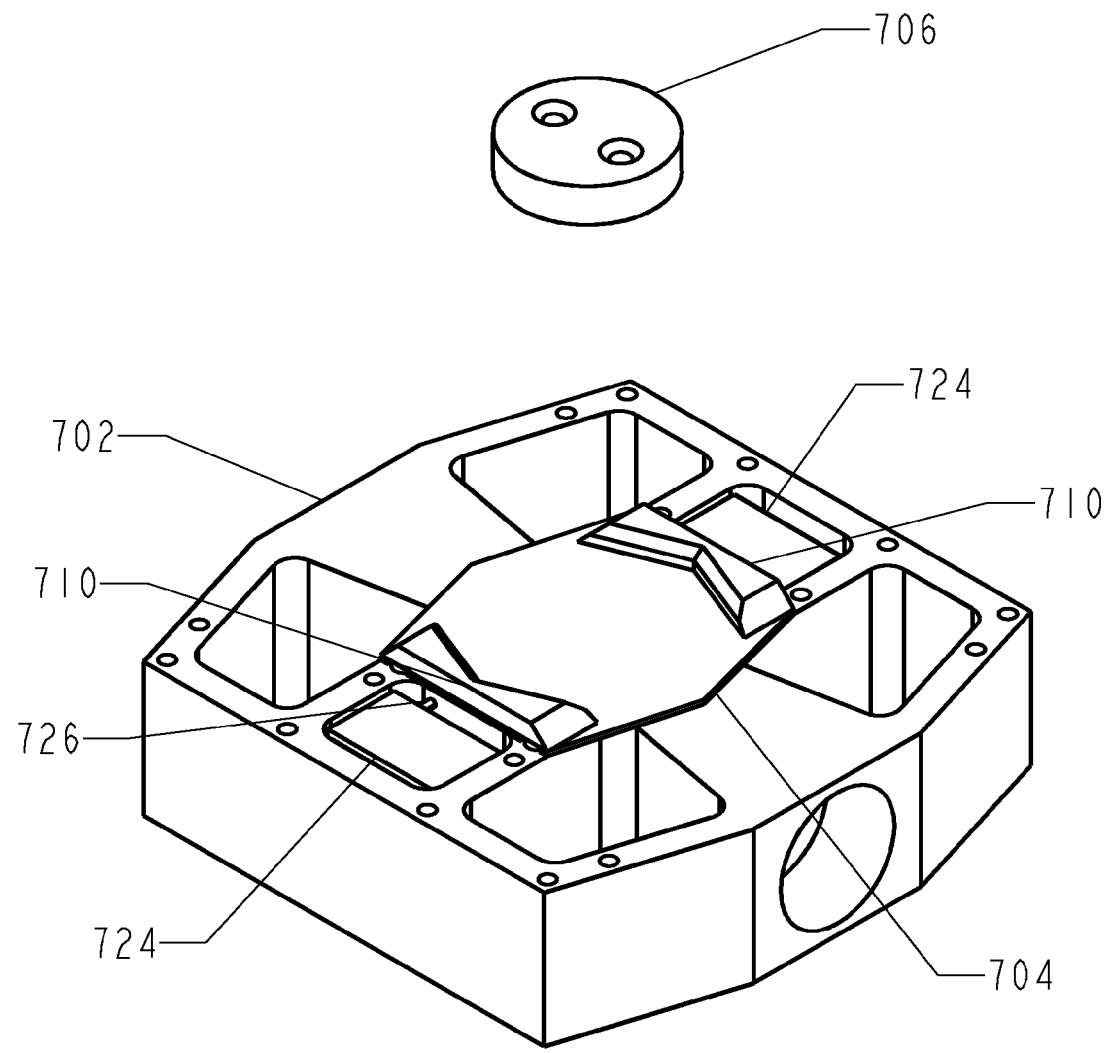
FIG. 7A illustrates a perspective view of another embodiment of the variable magnetic binding system, depicting a pedal with an integrated electromagnetic mechanism having cover sheets and retaining pieces, and a shoe piece.
Figure 7B:
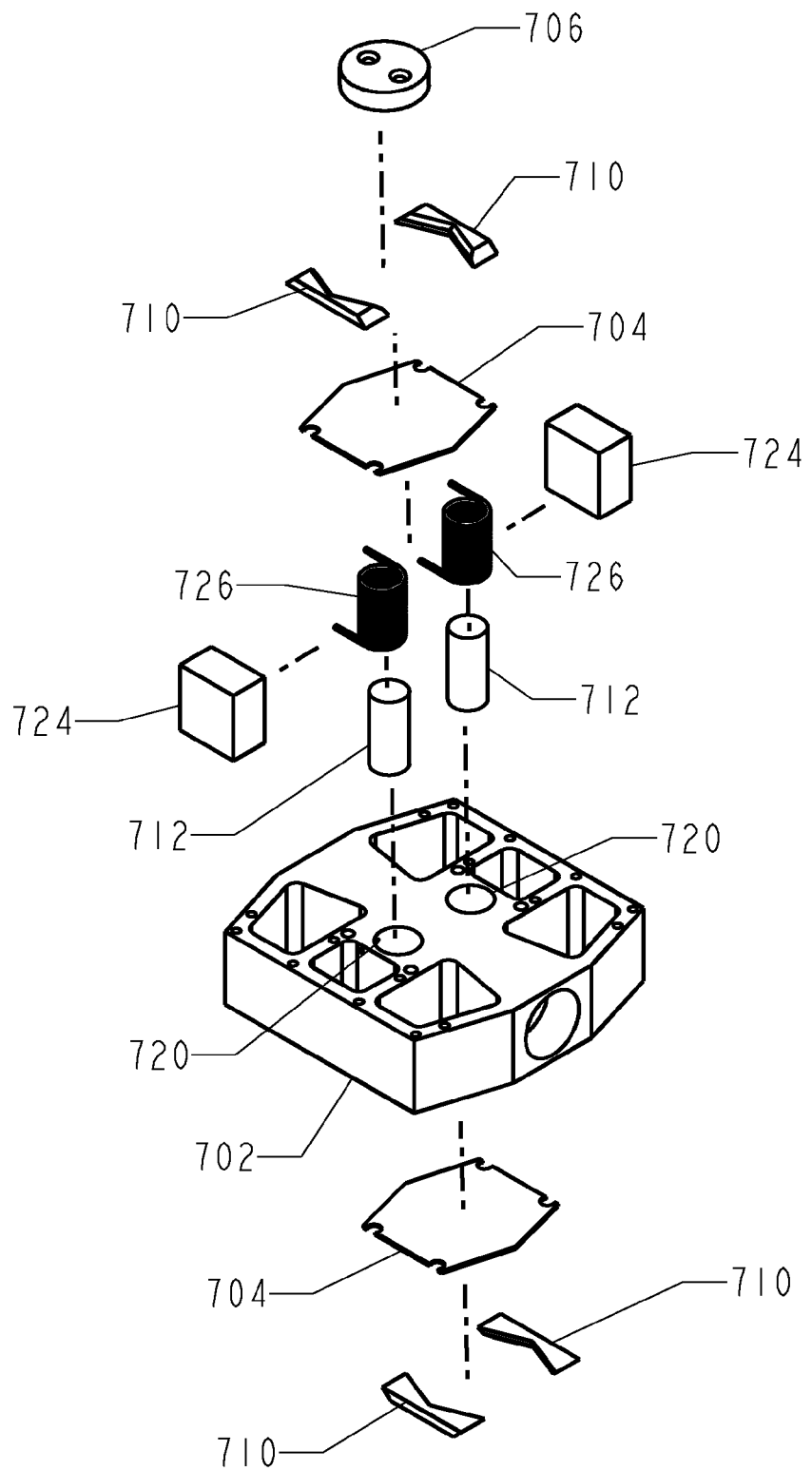
FIG. 7B illustrates a perspective exploded view of an embodiment of the variable magnetic binding system, depicting a pedal with an integrated electromagnetic mechanism having cover sheets and retaining pieces, and a shoe piece.

Referring to FIG. 7A, in another embodiment the variable magnetic binding system is shown having a pedal 702, retaining pieces 710 on the pedal 702, a cover sheet 704, a battery pack 724, and wiring 726. FIG. 7B depicts an exploded view of this embodiment. In this embodiment, two cylindrical electromagnets 712 are placed within corresponding cylindrical abscesses 720 within the bike pedal 702 and are wrapped with wiring 726 from which they are powered. Wiring 726 is connected to a battery pack 724. The attractive force of the electromagnets 712 may be adjusted depending on the electrical input from the wiring 726 and battery pack 724. The electromagnets 712 are held in place by a cover sheet 704, which is fastened to the pedal 702. Retaining pieces 710 are mounted atop the cover sheet 704. The cover sheets 704 placed on both sides of the pedal 702 prevent the electromagnets 712 from being dislodged. The retaining pieces 710 are placed on both sides of the pedal 702 so that the cyclist does not have to differentiate which side of the pedal 702 to place the foot. Use of an electromagnet allows the cyclist to change the magnetic field strength of the pedal without necessarily needing to remove parts from the pedal, for example, by increasing the voltage and/or current output of the battery packs. In other embodiments, a power source may be external to the pedal 702 and controllable by switches or other suitable electronics that are positioned more conveniently for the cyclist to access than the pedals, such as near the bicycle handles. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "typical," "conventional," "traditional," "normal," "standard," "known" and terms of similar meaning should not be construed as limiting the time described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated or context dictates otherwise. Similarly, a group of items linked with the conjunction "or" should not be read as requiring mutual exclusivity among that group, but rather should also be read as "and/or" unless expressly stated or context dictates otherwise. Furthermore, although items, elements or component of the invention may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

Further, the purpose of the Abstract is to enable the U.S. Patent and Trademark Office and the public generally, and especially the scientists, engineers, and practitioners in the art who are not familiar with patent or legal terms or phraseology to determine quickly from a cursory inspection the nature and essence of the technical disclosure of the application. The Abstract is not intended to be limiting as to the scope of the present invention in any way.

What is claimed is:

1. A variable magnetic binding system, comprising:
   a pedal body having outer surfaces and a rotation axis, a cavity disposed between at least two of the outer surfaces, and at least one magnetic body removably insertable into the cavity such that a magnetic field through the pedal body is increased or decreased by insertion of the at least one magnetic body, wherein the pedal body is configured to be attached to a bicycle crank arm of a bicycle and to rotate around the rotation axis while engaging a foot of a user pedaling the bicycle;
   at least one cover plate attached directly to the pedal body parallel to the rotation axis using fasteners attached to the pedal body, the magnetic body being retained in the cavity by the cover plate, the cavity extending through the pedal body in a direction perpendicular to the at least one cover plate.

2. The variable magnetic binding system of claim 1, further comprising:

a second magnetic body removably insertable into said cavity, the second magnetic body having different magnetic properties from said at least one magnetic body, wherein said at least one magnetic body is interchangeable with the second magnetic body, thereby changing said magnetic field through said pedal body.

3. The variable magnetic binding system of claim 1, wherein said cavity comprises one or more continuous passages from one said outer surface of said pedal body to another of said outer surfaces.

4. The variable magnetic binding system of claim 1, said pedal body further comprising at least one spacer insertable into said cavity, wherein said magnetic body and the spacer are selectively arrangeable in said cavity in order to increase or decrease the magnetic field at at least one outer surface of said pedal body.

5. The variable magnetic binding system of claim 1, wherein thickness of said cover plate is adjustable by adding one or more additional cover plates onto said cover plate or by exchanging said cover plate for a thicker or thinner separate cover plate, the thickness change thereby increasing or decreasing said magnetic field through said pedal body at at least one of said outer surfaces.

6. The variable magnetic binding system of claim 1, further comprising at least one shoe piece magnetically attracted to the magnetic body within the cavity.

7. The variable magnetic binding system of claim 6, wherein said shoe piece comprises flexible magnetic material magnetically attracted to the magnetic body within the cavity.

8. The variable magnetic binding system of claim 6, further comprising an alternate shoe piece interchangeable with said shoe piece, the alternate shoe piece having at least one size dimension and said shoe piece having at least one corresponding size dimension wherein the size dimension of the alternate shoe piece is larger than the corresponding size dimension of said shoe piece and thereby has greater magnetic attraction to said pedal body.

9. The variable magnetic binding system of claim 6, wherein said shoe piece is comprised of multiple pieces of magnetically-attracted material linked together by a flexible material.

10. The variable magnetic binding system of claim 6, further comprising a shoe comprising a sole, wherein said shoe piece is selectively retractable into the sole.

11. The variable magnetic binding system of claim 6, wherein said shoe piece comprises openings configured to connect the shoe piece to clip-compatible shoes using a fastener.

12. The variable magnetic binding system of claim 6, further comprising one or more retaining feature on an outside surface of said pedal body, the retaining feature guiding and receiving said shoe piece to a retained position on said pedal body.

13. The variable magnetic binding system of claim 1, wherein said magnetic body is selectively insertable into said pedal body, such that the magnetic field on one surface of said pedal body is greater than an opposing surface of said pedal body.

14. A variable bicycle foot pedal magnetic binding system for securing a foot pedal to a foot of a cyclist, the bicycle foot pedal comprising:
  a pedal body having outer surfaces and a rotation axis, wherein a plurality of cavities is disposed between at least two of the outer surfaces, the plurality of cavities each having a cavity size and a cavity shape, the plurality of cavities extending through an entire depth of the pedal body in a direction perpendicular to the rotation axis, wherein the pedal body is attachable to a bicycle crank arm of a bicycle to rotate around the rotation axis while engaging a foot of a user pedaling the bicycle;
  a cover plate removably attached directly to the pedal body, the cover plate being attached to the pedal body in a position parallel to the rotation axis of the pedal body, wherein each cavity of the plurality of cavities extends through the pedal body in a direction perpendicular to the cover plate;
  a plurality of magnetic bodies removably insertable into the plurality of cavities, wherein a magnetic field through the pedal body is increased or decreased by insertion of a plurality of magnetic bodies, each of the plurality of magnetic bodies having a magnetic body size and a magnetic body shape, wherein the magnetic body size corresponds with the cavity size and the magnetic body shape corresponds with the cavity shape;
  a shoe piece comprising a material that is magnetically attracted to the plurality of magnetic bodies, the shoe piece having openings corresponding with openings of clip-compatible shoes.

\* \* \* \* \*